United States Patent [19]
Giacomini

[11] Patent Number: 5,165,330
[45] Date of Patent: Nov. 24, 1992

[54] FRYER WITH A ROTARY SPIRAL FOOD CONVEYOR

[75] Inventor: Cristano Giacomini, Rovereto, Italy

[73] Assignee: RTM S.p.A., Rovereto, Italy

[21] Appl. No.: 603,343

[22] Filed: Oct. 26, 1990

[30] Foreign Application Priority Data

Oct. 31, 1989 [IT] Italy .................. 82605 A/89

[51] Int. Cl.$^5$ ............................................. A47J 37/12
[52] U.S. Cl. ........................................ 99/404; 99/407; 99/443 C; 134/132
[58] Field of Search ............ 99/403, 404, 407, 443 R, 99/443 C, 365, 323.9, 323.11; 134/132, 157, 158; 198/724, 778; 68/158

[56] References Cited

U.S. PATENT DOCUMENTS

| | | | |
|---|---|---|---|
| 2,267,970 | 12/1941 | Boal | 198/778 |
| 2,614,485 | 10/1952 | Sinkwitz et al. | 99/404 |
| 3,296,954 | 1/1967 | Haub et al. | 99/407 X |
| 3,474,726 | 10/1969 | Curtin | 99/404 |
| 3,614,924 | 10/1971 | Hickey | 99/404 |
| 3,645,196 | 2/1972 | Johnston et al. | 99/407 X |
| 3,834,408 | 9/1974 | Thalacker | 134/132 X |

FOREIGN PATENT DOCUMENTS

| | | | |
|---|---|---|---|
| 1128807 | 4/1962 | Fed. Rep. of Germany | 198/724 |
| 1192101 | 3/1988 | Italy | 99/407 |

Primary Examiner—Harvey C. Hornsby
Assistant Examiner—C. Cooley
Attorney, Agent, or Firm—Guido Modiano; Albert Josif

[57] ABSTRACT

Fryer having a closeable container which is provided, in an upward position, with a closeable opening for introducing a product to be fried. The container furthermore has a fume suction duct and, proximate to the bottom, a plurality of armored electric resistors. A perforated separating partition which has a spiral-shaped configuration is arranged inside the container; the separating partition extends between two walls, starting from a first lateral wall of a conveyor which is suitable for pushing the fried product outside the container up to the open top of a second lateral wall of the conveyor which is opposite to the first one. The fryer furthermore has a sealed and motorized shaft which is connected to a support to which one or more articulated bars are radially associated; the bars are connected to blades adapted for pushing the product along the separating partition.

14 Claims, 1 Drawing Sheet

FRYER WITH A ROTARY SPIRAL FOOD CONVEYOR

BACKGROUND OF THE INVENTION

The present invention relates to a fryer which is particularly usable for frying food products such as french fries, small-size fish, meat rolls and parts of farmyard animals.

Some known fryers are constituted by a container for oil, which can be heated by means of adapted armored electric resistors.

An appropriately perforated basket, which contains the product to be fried, is then placed manually inside said container.

Said fryers, which are mostly for domestic use, furthermore have a lid which must be removed once the cooking of the product is completed in order to remove the basket and drain the oil from the product prior to eating it.

Said known types of fryers naturally entail long cooking times and furthermore require the presence of an operator for the introduction and removal of the product, and for controlling the emission of fumes into the environment.

As a partial solution to these disadvantages, fryers are known which are internally provided with a basket which is mechanically overturned, after a preset time, so as to convey the fried product into a vessel which is adjacent to the container.

Even these known types of fryers, however, have disadvantages; in fact known fryers can only provide a relatively small quantity of fried food at the end of each cooking cycle, because only one single portion of the food can be cooked during each cycle.

As a partial solution to these disadvantages, Italian Patent No. 1192101 (by the same Applicant, filed on Sep. 26, 1985 with application No. 41601 A/85 and granted on Mar. 31, 1988), discloses a fryer comprising a container which has, inside it, a carousel for a plurality of perforated baskets which cooperate with mechanical means; some of said mechanical means are arranged outside the container to raise the baskets and others are arranged inside the container to allow the overturning of said baskets.

This fryer furthermore comprises, inside the container, a first removable conveyor for conveying the product to be fried into the baskets, as well as a second conveyor, which is also removable, for conveying the fried product to a closeable opening.

The fryer furthermore comprises means for sensing the position of the baskets and an external centralized logic unit for actuating the drives.

Though this fryer undoubtedly offers valid solutions to problems occurring in prior known devices, it has some disadvantages: first of all, it is structurally very complicated and is therefore subject to frequent jamming during the lifting and overturning of the baskets. Furthermore difficulties during the movement of said baskets have been observed.

In addition, the need to provide the positioning of the baskets inside the container, as well as their lifting and overturning, requires that the container for the fryer have considerable dimensions.

Finally, in view of the structural complexity of the means for moving, lifting and overturning the baskets, there is the need for very assiduous maintenance which considerably raises the management costs associated with the fryer, making it uneconomical.

SUMMARY OF THE INVENTION

The aim of the present invention is therefore to eliminate the disadvantages described above in known types by providing a fryer which allows to obtain a large number of portions of cooked product in a very short time while having a very simple structure.

Within the scope of the above described aim, an important object is to provide a fryer having a structure which is practically free from extraordinary maintenance while routine maintenance is executable in a very rapid and easy manner.

Another important object is to provide a fryer which has in addition to the preceding characteristics, the advantage of being reliable and safe in use.

A further object is to provide a fryer which has very modest manufacturing and management costs.

This aim, these objects and others which will become apparent hereinafter are achieved by a fryer as defined in the appended claims.

BRIEF DESCRIPTION OF THE DRAWINGS

Further characteristics and advantages of the invention will become apparent from the detailed description of a preferred but not exclusive embodiment, illustrated only by way of non-limitative example in the accompanying drawings, wherein.

DESCRIPTION OF THE PREFERRED EMBODIMENTS

Figure 2:
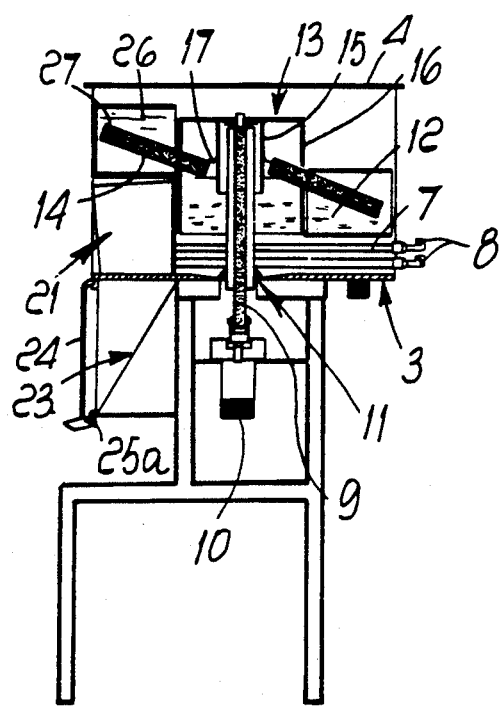
FIG. 2 is a sectional elevation view of the fryer taken along a plane which is diametrical with respect to the container.
Figure 1:
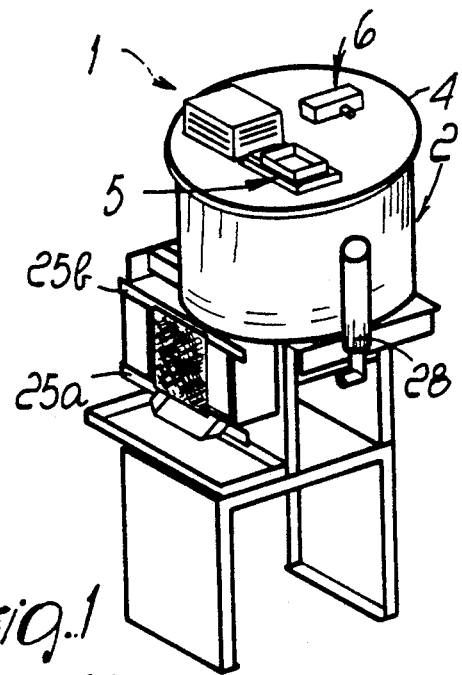
FIG. 1 is a perspective view of the fryer.
Figure 3:
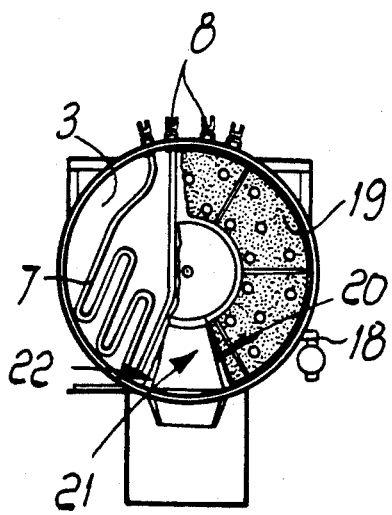
FIG. 3 is a top view of the fryer in which the separating partition has been discontinued for the sake of clarity.
Figure 4:
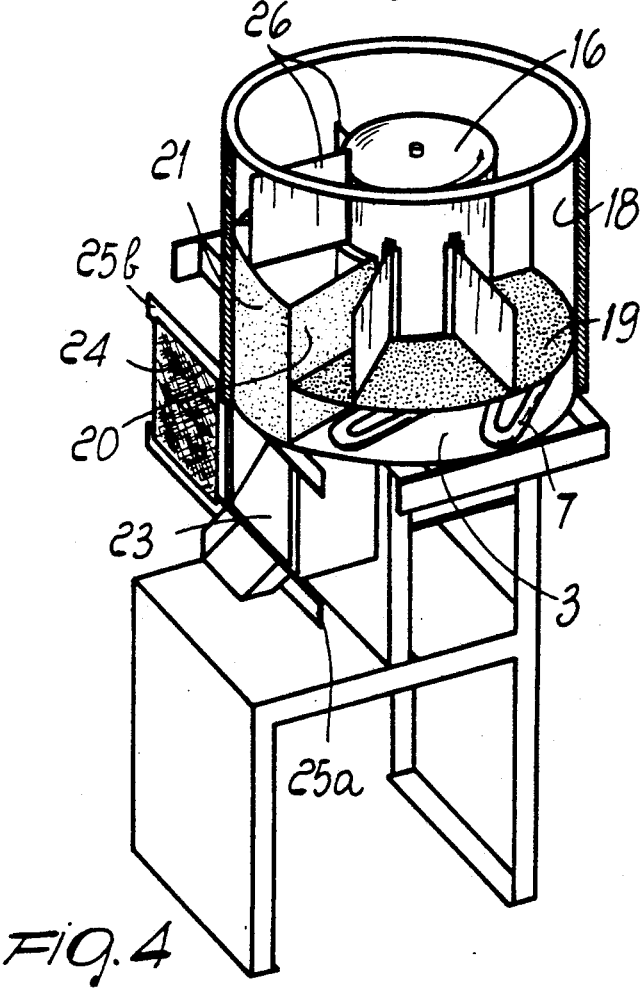
FIG. 4 is a partially sectional perspective view, similar to that of FIG. 1, of the fryer.

With reference to the above figures, the fryer, which is generally indicated by the reference numeral 1, comprises an advantageously cylindrical and insulated container 2 which has a bottom 3 and, above it, a removable lid 4 which has at least one first opening 5 for introducing therein the product to be cooked, such as for example a frozen product, and a duct for the suction of the frying fumes, indicated by the reference numeral 6, which is preferably connected to a filter and appropriate suction means for the removal of fumes. The container 2 can be insulated by arranging a further container externally and coaxially thereto and by filling the space between the two containers with appropriate insulating material.

The container 2 is furthermore connected to the outside by means of an adapted duct 28 in order to allow the viewing from outside of the level of the oil contained therein.

A plurality of armored electric resistors 7 is furthermore arranged proximate to the bottom 3 inside the container 2; said resistors have, outside said container 2, adapted electric power supply couplings 8.

A shaft 9 is arranged coaxially to the container 2, and protrudes below the bottom 3 and is connected to an adapted motor 10.

Said shaft 9 is sealed in the container 2, since a first tubular element 11 is provided externally of the shaft and coaxially thereto and has its lower end welded at the bottom 3.

In this manner it can be observed that the maximum level of the oil 12 contained in the container 2 is lower than the level of arrangement of the upper ends of said shaft 9 and of said first tubular element 11.

The shaft 9 furthermore protrudes above the end of the first tubular element 11 which is inside the container 2, and a support 13 for a plurality of bars 14 is associated therewith.

Said support 13 is constituted by a second tubular element 15, which is arranged externally and concentrically to the first tubular element 11, and by a third tubular element 16 which is in turn arranged concentrically and externally to the second tubular element 15.

A plurality of wings 17 are oriented radially to the second tubular element 15, and an end of a bar 14 is freely pivoted to each of said wings in such a manner to allow the bars 14 to oscillate in a vertical plane.

Advantageously, the number and arrangement of said bars are such as to define a regular polygon at their vertices.

Each of the bars 14 protrudes, through an adapted opening, outside the third tubular element 16, said openings being defined along an axis which is longitudinal to said third tubular element.

A perforated separating partition 19 is arranged between the lateral walls of said third tubular element 16 and the internal lateral wall 18 of the container 2 and has a spiral-shaped configuration which extends from a first outer lateral wall 20 of a chute 21 for conveying the fried product, by gravity to the outside of the container 2. The chute has a box-like shape which is open above and below.

The upper end of said chute 21 for the removal of the fried product is naturally at a level which is higher than the maximum level which can be reached by the oil 12.

The separating partition 19 therefore starts from said first outer lateral wall 20 at a lower level with respect to the oil maximum level, extends in a spiral around the third tubular element 16 until it arrives at the top of the second outer lateral wall 22 of the chute 21 which is opposite to the first outer lateral wall 20.

Advantageously, a hopper 23 for discharging the fried product is provided below said conveyor 21 and can be temporarily closed by means of an adapted panel 24 which is slidable at adapted guides 25a and 25b.

A conveyor blade 26 is associated with the terminal ends of each bar 14 and has a lamellar configuration and dimensions which are slightly smaller than the interspace between the inner wall 18 of the container 2 and the outer wall of the third tubular element 16.

The height of each blade 26 is such that once the bar 14 is arranged proximate to the end of the second outer lateral wall 22 of the conveyor 21, said conveyor blade does not touch the lid 4.

Advantageously, the terminal end of each bar 14 has a longitudinal slot 27 for allowing the conveyor blade 26 to be pivotally connected to the bar 14 by means of appropriate connection means.

The operation of the fryer is therefore as follows: the first opening 5 defined on the lid 4 is arranged so that the product to be fried is placed, once it is introduced through said opening 5, between two adjacent conveyor blades 26, one of which is arranged adjacent to the first outer lateral wall 20 of the chute 21.

The subsequent rotation imparted by the motor 10 to the shaft 9 and therefore to the second tubular element 15 and to the third tubular element 16 corresponds to a movement imparted by the conveyor blades 26 to the product inside the heated oil for a preset time.

The rotation of the conveyor blades thus pushes the product on the separating partition up to the region thereof which rises from the oil 12.

During this rotation step, the product, which is contained between two adjacent blades, is pushed along the separating partition and is subjected to dripping since said separating partition 19 is perforated.

The final step occurs when the conveyor blades 26 push the product at the upper opening of the chute 21: there the fried product falls by gravity into the conveyor and is unloaded, for example, outside.

By virtue of the articulations of the bars 14 at the wings 17 and at the conveyor blades 26, during the rotation step said conveyor blades are adapted to follow the contour of the separating partition 19 and rise as the plane of arrangement defined by the separating partition rises from the bottom 3.

When a wing passes beyond the plane of arrangement of the first outer lateral wall 20 of the chute 21, it subsequently falls onto the underlying separating partition 19 and restarts the cycle.

It has thus been observed that the invention has achieved the intended aim and objects, a fryer having been provided which allows to achieve the easy and optimum cooking of food inside it in a very short time and according to a continuous cycle.

The fryer furthermore has a very simple structure which gives it optimum convenience in use from the specific point of view of high production with very low manufacturing and management costs.

Maintenance is in fact virtually non-existent, since no movement is imparted directly by complicated mechanisms arranged inside or outside the container, since the mere rotation imparted to the conveyor blades allows the food to cook and be delivered outside the fryer by virtue of the configuration of the separating partition which guides said conveyor blades.

The only possible component which is subject to maintenance is the motor 10, which is external to the container and therefore easily accessible.

The invention is naturally susceptible to numerous modifications and variations, all of which are within the scope of the same inventive concept.

Similarly, the materials and dimensions which constitute the individual components of the fryer may also be chosen according to the specific requirements.

I claim:

1. A fryer comprising;
    a cylindrical container;
    a removable lid placed on said container;
    an opening formed in said lid for introducing a product to be fried into said container,
    a duct provided in said lid;
    a bottom defined by said container;
    a plurality of armored electric resistors provided proximate to said bottom of said container;
    an upwardly open chute located inside said container, said chute having a first lateral wall, a second lateral wall located opposite said first lateral wall, and an upper opening;
    a support provided concentrically within said container;
    a rotatable shaft connected to said support;

a plurality of bars extending radially from said support, each bar of said plurality of bars being articulated to said support;

a motor connected to said shaft for rotating said shaft, said support and said bars inside said cylindrical container;

a spiral-shaped perforated separating partition provided inside said container and extending upwardly around said support from said first lateral wall to said second lateral wall adjacent said upper opening of said chute, a conveyor blade connected to each of said bars for conveying the fried product along said spiral-shaped perforated separating partition upon activating said motor.

2. Fryer according to claim 1, wherein said container is insulated, and wherein said shaft is arranged coaxially with respect to said container and protrudes below said bottom, said fryer further comprising a first tubular element, said first tubular element being located externally and coaxially with respect to said shaft and having a lower end, said lower end being welded to said bottom of said container.

3. Fryer according to claim 2, wherein said shaft and said first tubular element each have an upper end, and wherein said container has a maximum oil containment level, said maximum oil containment level being lower than said upper end of said first tubular element.

4. Fryer according to claim 2, wherein said shaft and said first tubular element each have an upper end, the upper end of said shaft protruding above said upper end of said first tubular element, said support being connected to said upper end of said shaft.

5. Fryer according to claim 3, wherein said upper opening of said chute is located at a higher level than said maximum oil containment level of said container.

6. Fryer according to claim 3, wherein said support further comprises a second tubular element and a third tubular element, said second tubular element being arranged externally and concentrically with respect to said first tubular element, said third tubular element being arranged concentrically and externally with respect to said second tubular element, said third tubular element having an external lateral wall, said container having an internal lateral wall, said perforated separating partition extending in a spiral around said third tubular element between said external lateral wall of said third tubular element and said internal lateral wall of said container, from a level lying below said maximum oil containment level to said second lateral wall of said chute which is opposite to said first lateral wall.

7. Fryer according to claim 1, wherein said container is insulated, wherein said shaft is arranged coaxially with respect to said container and protrudes below said bottom, said fryer further comprising a first tubular element, said first tubular element being located externally and coaxially with respect to said shaft and having a lower end, said lower end being welded to said bottom of said container, and wherein said support further comprises a second tubular element and a third tubular element, said second tubular element being arranged externally and concentrically with respect to said first tubular element, said third tubular element being arranged concentrically and externally with respect to said second tubular element.

8. Fryer according to claim 7, wherein said support further comprises a plurality of wings, said wings extending radially from said second tubular element, each bar among said plurality of bars having an end said end of each said bar being pivotally connected to one of said wings.

9. Fryer according to claim 7, wherein said third tubular element has formed therein a plurality of longitudinal openings, and wherein one of said bars protrudes through each of said longitudinal openings.

10. Fryer according to claim 7, wherein said third tubular element has an external lateral wall, and wherein said container has an internal lateral wall, said spiral shaped perforated separating partition being arranged between said external lateral wall of said third tubular element and said internal lateral wall of said container, said spiral-shaped separating partition extending substantially perpendicularly from said first lateral wall of said chute and around said third tubular element to said second lateral wall of said chute, said chute having a box-like shape.

11. Fryer according to claim 8, wherein each bar has a terminal bar end, each said terminal bar end having connected thereto a conveyor blade, each conveyor blade having a lamellar configuration, wherein said third tubular element has an external lateral wall, and wherein said container has an internal lateral wall, an interspace being defined between said external lateral wall of said third tubular element and said internal lateral wall of said container, each said conveyor blade being slightly smaller than said interspace.

12. Fryer according to claim 8, wherein each conveyor blade has a terminal end and wherein each bar has a terminal bar end, said terminal end of each said conveyor blade being pivotally connected to said terminal bar end of one of said bars.

13. Fryer according to claim 1 further comprising;

a hopper for discharge of the fried product provided below said chute;

a panel for temporarily closing said hopper, and;

guides for slideably supporting said panel.

14. Fryer according to claim 1, wherein said container is insulated by means of a second container arranged externally and coaxially thereto, insulating material being arranged between said container and said second container.

* * * * *